Aug. 20, 1929.  W. N. BOOTH  1,725,333
METHOD OF FORMING SPOKED VEHICLE WHEELS
Filed March 14, 1927   2 Sheets-Sheet 1

Inventor
William N. Booth
By
Whittemore Hulbert Whittemore Belknap.
Attorney

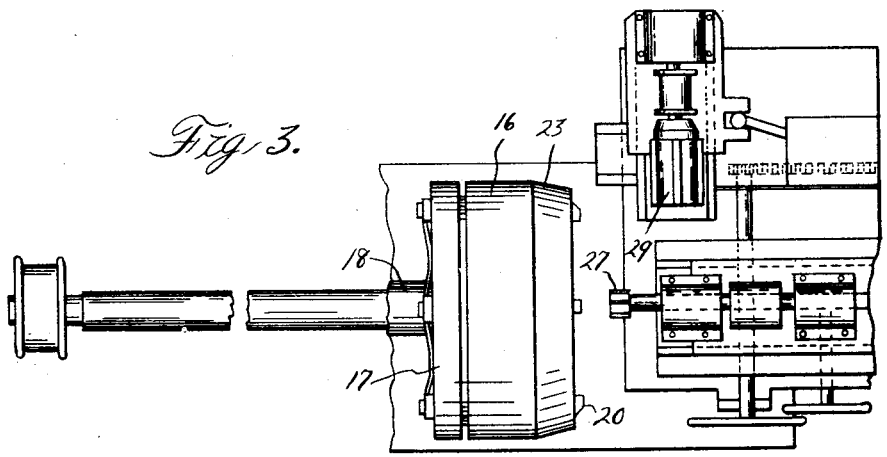
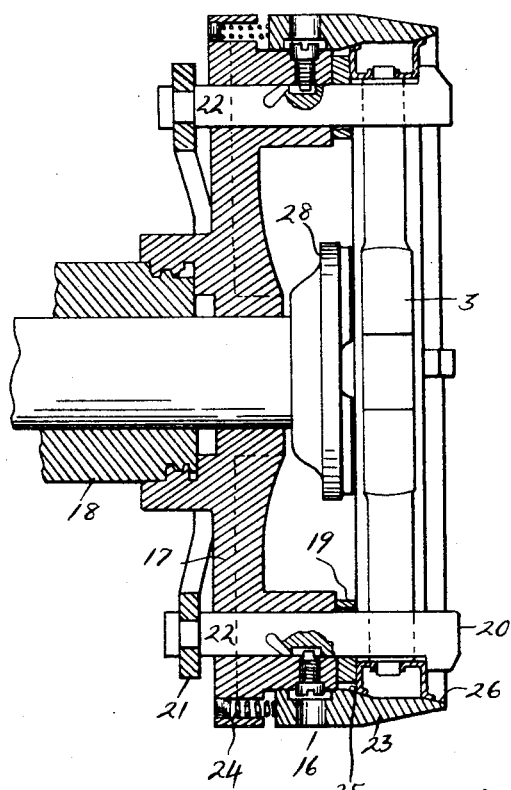

Patented Aug. 20, 1929.

1,725,333

UNITED STATES PATENT OFFICE.

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK.

METHOD OF FORMING SPOKED VEHICLE WHEELS.

Application filed March 14, 1927. Serial No. 175,373.

The invention relates to the manufacture of spoked wheels and refers more particularly to that type having wooden spokes and metallic fellies. Heretofore it has been the usual practice in the manufacture of wheels of this character to initially assemble the spokes with the felly and to then force the spokes to their permanent positions, during which the spokes are moved radially outward against the felly as well as laterally to place. Then the wheel is faced and bored while held by a chuck engaging its felly. With this method the forcing of the spokes to their permanent positions generally results in a felly which is out of round so that its rim seat will not properly engage the demountable rim. Since the felly is used for centering the wheel during the boring step the completed wheel is generally out of balance also. With my method a balanced spoked wheel is formed without the necessity of machining the continuous rim at the outer ends of the spokes. Also with my method a wheel is formed having a felly with a circular rim engaging seat. With these as well as other objects in view, the invention resides in the novel features as more fully hereinafter set forth.

In the drawings:—

Figure 3 is a plan view partly in section and shown diagrammatically to illustrate an apparatus for carrying out succeeding steps of my method;

Figure 4 is an enlarged transverse section through the chuck of the apparatus shown in Figure 3;

Figure 1:
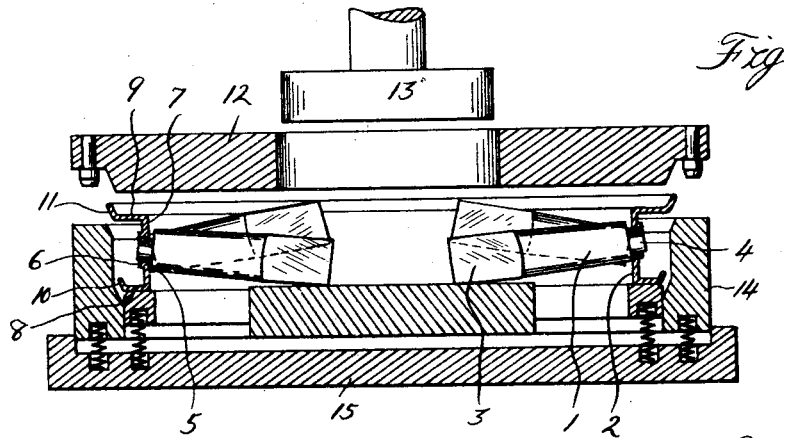
Figures 1 and 2 are diagrammatic transverse sections through an apparatus and wheel illustrating the first and second steps of my method.

The vehicle wheel shown in the present instance has the wooden tenoned spokes 1 and the continuous metallic channel shaped felly 2. The spokes have double mitered inner ends 3 which in the completed wheel form the hub section. The spokes have at their outer ends the tenons 4 and the annular shoulders 5 surrounding the tenons. The tenons are engageable in the ferrules 6 upon the base 7 of the felly and extending radially outward from the axis of the wheel, while the annular shoulders are engageable with bosses upon the base of the felly and extending radially inward or toward the axis of the wheel. The felly has the front and rear flanges 8 and 9, respectively, formed at their outer edges with tapered annular rim engaging seats 10 and 11, respectively, these seats being for engagement with a demountable rim.

Figure 2:
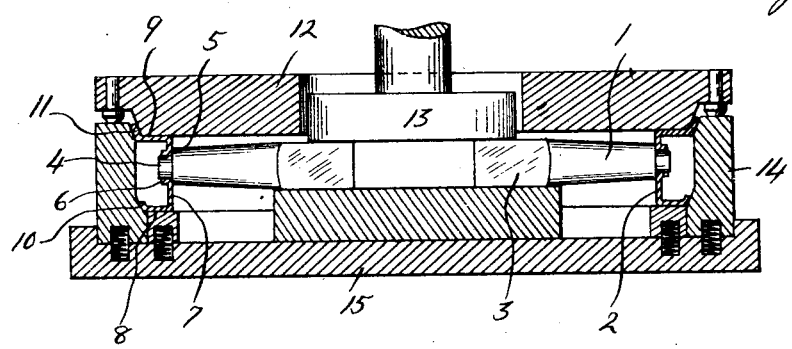

After the spokes have been formed and the felly formed and sized as well as made circular, the spokes are initially assembled with the felly by inserting their tenons 4 in the ferrules 6 and partially engaging their inner double mitered ends 3. The partially assembled wheel is then placed with its front flange lowermost in the apparatus illustrated in Figures 1 and 2 when the felly engaging pressure plate 12 and the spoke engaging pressure plate 13 and also the felly truing ring 14 are raised to the positions shown in Figure 1. Then the pressure plate 12 is suitably forced downwardly toward the base 15 of the apparatus to engage the rear flange 9 of the felly as well as the tapered annular flange at the outer edge of this flange and forming the rim engaging seat 11. Then upon continued downward movement of the pressure plate 12 it carries the felly downwardly to force its rim engaging seats 10 and 11 into contact with the felly truing ring 14. The spoke engaging pressure plate 13 is then lowered toward the base 15 and laterally forces the spokes to their permanent position during which time they move angularly. The parts are then in the position shown in Figure 2. With this apparatus the rim engaging seats of the felly are held circular and to size and the front and rear flanges of the felly are also held in their correct relative positions during the lateral forcing of the spokes to their permanent position. Inasmuch as no pilot is provided at the inner ends of the spokes they are not positively held out against the felly so that all are free to relatively move to distribute the pressure over all and the inner end of a longer spoke can move nearer the axis of the wheel than the others.

The wheel with the spokes in their permanent positions in the felly is then placed in the apparatus illustrated in Figures 3 and 4 for facing the opposite sides of the hub section formed by the double mitered ends 3 of the spokes and boring the same to form the hub opening. The wheel is placed with its front flange foremost in the chuck 16 of this apparatus, which chuck comprises the head 17 upon the arbor 18, the abutment ring 19 secured to the head and the clamping jaws 20 extending transversely of the head and longitudinally slidably engaging the same. These jaws are engageable with the rear flange of the felly near the base and are adapted to force the felly to bring its front flange into contact with the abutment ring 19. Suitable means may be provided for simultaneously actuating all of the jaws, this means comprising in the present instance the cam ring 21 engaging the rear ends of the shanks 22 of the jaws and rotatable concentrically of and relative to the head. For centering the wheel, I have provided the centering ring 23 which is slidably mounted upon the head 17 to move transversely thereof and is held in its outermost position by the coil springs 24. This centering ring is provided with tapered annular faces 25 and 26 for respectively engaging the rim engaging seats 10 and 11 upon the felly. The arrangement of chuck is such that after the wheel has been placed in the chuck the rim engaging seats of the felly are first brought into contact with the centering ring and then both the wheel and the centering ring are moved together until the front flange of the felly is brought against the abutment ring.

After the wheel has been chucked it may then be axially bored and its opposite sides may be faced. The boring is preferably effected first by means of the boring tool 27 which is suitably rotated and may be fed transversely of the wheel to bore the hub hole in the hub section formed by the double mitered inner ends of the spokes. This boring tool may then be removed after which the facing cutter 28 may be moved transversely of and toward the wheel to face the front sides of the hub section. Then the facing cutter 29 may be moved transversely of and toward the wheel to face the rear sides of the hub section. Both the facing cutters are so positioned in the apparatus that when in operation their cutting edges are in parallel planes so that the opposite sides of the hub section when completed will be parallel. In this connection it is apparent that the chuck 16 might be revolved during the times of boring and facing to insure accurately boring and facing the wheel.

Figure 5:
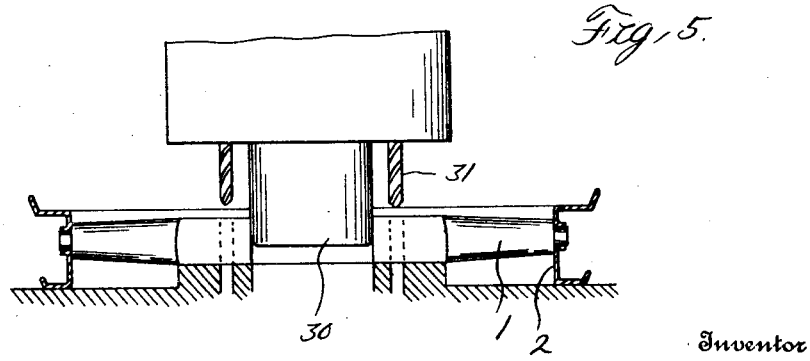
Figure 5 is a transverse section through an apparatus illustrating a succeeding step of my method.

After these operations the wheel may be removed and placed in the apparatus shown in Figure 5 for boring the bolt holes, the wheel being preferably positioned in this apparatus by the pilot 30 which engages the hub opening of the wheel and is concentrically positioned relative to the drills 31. Thus it will be seen that by also concentrically positioning the bolt holes the bolts for securing the wheel to the fixed hub flange are concentrically positioned as well as the brake drum for the wheel since this brake drum is secured by the same bolts.

From the above description, it will be readily seen that I have devised a greatly improved method of manufacturing a vehicle wheel by means of which the wheel is balanced and will very largely eliminate shimmying, which is a common occurrence with wheels as now used with low pressure or balloon tires.

What I claim as my invention is:

1. The method of forming a spoked wheel having a continuous rim member, which includes initially assembling the spokes with the rim member, holding the rim member both laterally and circumferentially true, and forcing the spokes to their permanent positions while the rim member is thus held.

2. The method of forming a spoked wheel having a continuous rim member, which includes initially assembling the spokes with the rim member, holding the rim member both laterally true and circular and angularly moving the spokes relative to the rim member and to their permanent positions while the rim member is thus held.

3. The method of forming a wheel having wooden tenoned spokes and a continuous metallic rim member with ferrules, which includes initially assembling the spokes with the rim member with the tenons of the spokes engaging the ferrules of the rim member, holding the rim member both laterally and circumferentially true and angularly moving the spokes relative to the rim member and to their permanent positions while the rim member is thus held.

4. The method of forming a spoked wheel having a continuous felly with an annular seat for engaging a tire carrying rim, which includes initially assembling the spokes with the felly, holding the rim engaging seat circural and in its final diameter, and forcing the spokes to their permanent positions while the rim engaging seat is thus held.

5. The method of forming a spoked wheel having a continuous rim member, which includes initially assembling the spokes with the rim member, holding the rim member both laterally and circumferentially true, forcing the spokes to their permanent positions while the rim member is thus held, and then boring the spokes to form the hub opening while the wheel is centered from its rim member.

6. The method of forming a wheel having wooden spokes and a continuous metallic rim member, which includes initially assembling the spokes with the rim member, holding the rim member both laterally and circumferentially true, forcing the spokes to their permanent positions while the rim member is thus held, and facing the hub section of the spokes and boring the hub section of the spokes to form the hub opening while the wheel is centered from its rim member.

7. The method of forming a spoked wheel having a continuous channel-shaped felly with a seat upon one of its flanges, which includes initially assembling the spokes with the felly, laterally holding the flanges in position, peripherally holding the seat circular and forcing the spokes to their permanent positions while the flanges and seat are thus held.

8. The method of forming a spoked wheel having a continuous rim member, which includes initially assembling the spokes with the rim member, engaging the rim member with lateral and circular truing means by relatively moving the rim member and truing means into firm engagement for holding the rim member laterally true and circularly true, and forcing the spokes to their permanent positions while the rim member is thus held.

9. The method of forming a spoked wheel having a continuous metallic channel-shaped felly with seats upon its flanges, which includes initially assembling the spokes with the felly, exerting lateral pressure upon the flanges to hold the same in their proper relative positions, exerting radial pressure upon the seats to hold the same circular, and laterally forcing the spokes to their permanent positions while the flanges and seats are thus held.

In testimony whereof I affix my signature.

WILLIAM N. BOOTH.